CLOSED LOOP RATIO SQUARED DIVERSITY COMBINER

Filed March 24, 1964

INVENTOR.
Frederick H. Hartke
Victor Graziano
BY
Mueller & Aichele
Attys.

Oct. 31, 1967 V. GRAZIANO ETAL 3,350,646

CLOSED LOOP RATIO SQUARED DIVERSITY COMBINER

Filed March 24, 1964 2 Sheets-Sheet 2

INVENTORS
Frederick H. Hartke
Victor Graziano
BY Mueller & Aichele
Attys.

United States Patent Office 3,350,646
Patented Oct. 31, 1967

3,350,646
CLOSED LOOP RATIO SQUARED DIVERSITY COMBINER

Victor Graziano, Oak Park, Ill., and Frederick H. Hartke, Lynchburg, Va., assignors to Motorola, Inc., Chicago, Ill., a corporation of Illinois Filed Mar. 24, 1964, Ser. No. 354,227
7 Claims. (Cl. 325—305)

ABSTRACT OF THE DISCLOSURE

A closed loop ratio squared combiner in which the attenuated noise signals are sampled to develop a control signal. The control signal acts to regulate the attenuation of the input signals to equalize the noise level of each signal.

A common problem in radio communication is the degradation of the communication channel due to multipath fading. To minimize this effect diversity reception, in which several communication channels spaced apart in space and/or frequency, and in which the fading in the separate channels is noncoherent, is used. In a common form of diversity reception, the communication signals received on two separate channels are combined in order to get the best signal to noise ratio at the output.

A combiner can also be used in redundant systems having several receivers coupled to the same antenna and tuned to the same frequency. In coupling the antenna to two receivers there is a loss in the received to carrier power in each receiver which is regained in the combiner. Partial degradation or complete failure of one of the receivers is compensated for by the combiner. The use of a combiner in a redundant system of this type eliminates the need for an RF switch to select the best receiver.

In one form of combining, the communication channel having the best signal to noise ratio is selected and the other channel is not used. By taking advantage of the fact that the noise in the two channels is not coherent, in diversity reception and in most redundant systems, while the signal is coherent, a form of combining known as ratio squared combining can be used. This form of combining can give a net gain in the signal to noise power ratio of two times at the optimum point.

In ratio squared combining, portions of the signal from each channel are mixed to form a single output signal. The portion of the signal from each channel which is mixed to form the output signal is dependent upon the signal to noise ratio of each channel.

Prior art systems incorporating ratio squared combining have been of the open loop type. The proportion of each of the channels applied to the combined output is determined by the noise present in each channel. Attenuators or similar devices, operated by the noise voltage detected from each channel, are used to set the signal level from each channel. The gain vs. input signal strength of the amplifiers generating the attenuator control signals must be controlled precisely to meet given characteristics and these characteristics cannot be allowed to vary during operation of the unit. In practice it has been difficult to build and maintain systems of this type.

It is, therefore, an object of this invention to provide a ratio squared combining system which operates automatically to mix the received communication signals in a proportion which will provide an output signal having optimum signal to noise characteristics.

Another object of this invention is to provide a system of ratio squared combining which is relatively independent of the gain vs. input signal strength characteristics of the amplifiers used.

A feature of this invention is the provision of a combining system wherein each of the received communication channels includes a closed loop control system in which the noise present after attenuation is used to determine the amount of attenuation to apply to each of the signals.

Another feature of this invention is the provision of a receiving system including a single noise amplifier system alternately coupled to each of the received signals, with attenuators to set the desired attenuation level for each of the signals.

A further feature of this invention is the provision of a signal combining system including diode bridge attenuators in which the degree of attenuation is determined by the direct current bias voltage applied to the bridge. A portion of each bridge can be used as the combining resistance and a different portion of each bridge can be used to attenuate the communication signal applied thereto or the entire bridge can be used to attenuate the communication signal which is applied to a separate combining resistance.

The invention is illustrated in the drawing wherein.

In practicing the invention a receiving system is provided including diode attenuators to attenuate separate communication signals applied to a combining circuit. The attenuated noise voltages are coupled to an amplifier control circuit to generate direct current control voltages which are applied to the diode attenuators. In one form of this invention the amplifier control circuit is coupled to the midpoint of each of the attenuators so that a portion of each of the diode bridge attenuators serves as the combining resistance. The output of the attenuators and the combining resistance is coupled to subsequent receiver stages.

In another form of the invention the output of each of the diode attenuators is coupled to separate terminals of a fixed resistance which acts as the combining resistance. In each form of the invention the amplifier control circuit acts to set the level of each attenuator so that the noise voltages at each end of the combining resistance are susbtantially final.

Figure 1:
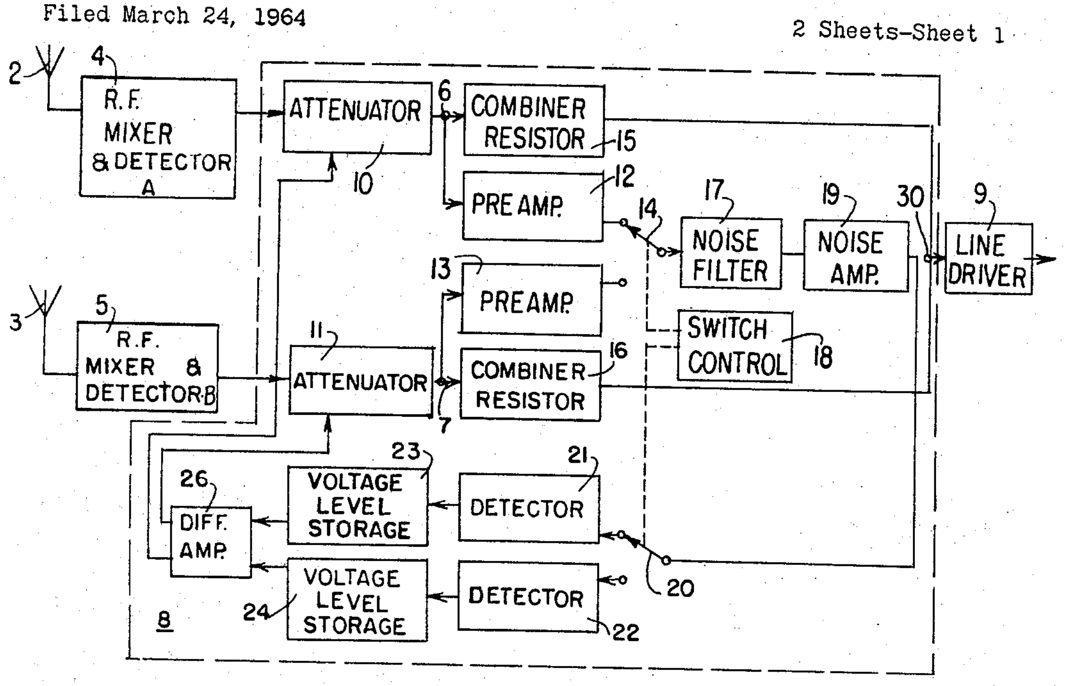
FIG. 1 is a block diagram of a system incorporating closed loop ratio squared combining.

A block diagram of a diversity communications system using ratio squared combining is shown in FIG. 1. Communication signals, containing the same information, are received by separate antennas 2 and 3 and are coupled to individual RF and mixer stages 4 and 5. The communication channels to which the separate RF stages and antennas are responsive are separated in space and/or frequency to provide a system in which the signals in one channel are not subjected to the same transmission path characteristics as the signals in the other channel, and thus the signal to noise ratio of each channel can be different.

RF and mixer stages 4 and 5 could also be tuned to the same frequency and coupled to the same antenna. This provides a redundant received system giving greater reliability than a single receiver system. Since the noise in most receiver systems is primarily developed in the receiver input stages the signals developed by the RF mixer stages 4 and 5 will consist of signals having non-coherent noise and a coherent signal as is the case with diversity systems. As in the diversity system the signal to noise ratio of each of the channels of the redundant system can be different.

In either the diversity or redundant systems the signals applied to stages 4 and 5 are converted to intermediate frequency signals and then detected to produce voltages of equal amplitude and coupled to a combiner 8. The output of the combiner 8 is coupled to a line driver 9 and from there it is coupled to remaining portions of the communications system for further processing as required. The combiner 8 acts to mix the signals from stages 4 and 5 in a proportion to achieve the optimum signal to noise ratio in the signal applied to line driver 9.

The signal from stage 4 is applied to attenuator 10 and the signal from stage 5 is applied to attenuator 11. A portion of the signal appearing at the output of attenuator 10, at point 6, is coupled to preamplifier 12, and a portion of the signal appearing at the output of attenuator 11, at point 7 is coupled to preamplifier 13. The signal coupled to the preamplifiers 12 and 13 contains both information and noise. These signals are coupled to noise filter 17, through switch 14. The output signal from filter 17 is proportional to the noise contained in the signal applied thereto. Switch control 18 alternately connects the noise filter 17 to preamplifier 12, and to preamplifier 13. The noise amplifier 19 amplifies the noise output of filter 17 and is coupled to the detectors 21 and 22 by means of switch 20. Switch 20 is synchronized with switch 14 by switch control 18 to couple the amplified noise signal from the output of attenuator 10 to detector 21 and the amplified noise signal from the output of attenuator 11 to detector 22. By using only one noise amplifier 19 and switching between the inputs, amplifier tracking problems are eliminated. Detectors 21 and 22 develop output potentials which are proportional to the magnitude of the noise contained in the attenuated signals.

The outputs of detectors 21 and 22 are coupled to voltage level storage circuits 23 and 24 respectively. Voltage level storage circuit 23 maintains a voltage level corresponding to the output of detector 21 during the period that switch 20 is coupled to the detector 22, and voltage level storage circuit 24 maintains a voltage level corresponding to the output of detector 22 during the period that switch 20 is coupled to detector 21. The output voltages stored in the voltage level storage means 23 and 24 are proportional to the noise voltages at the terminals of the combining resistance points 6 and 7. These voltages are coupled to differential amplifier 26 to develop a control signal for the attenuators 10 and 11. The output signals from attenuators 10 and 11 are also coupled to combiner resistances 15 and 16. These resistances are connected at point 30 which is coupled to the line driver 9.

Differential amplifier 26 develops control voltages E1 and E2 in response to the detected noise voltages applied to the differential amplifier 26 from the voltage level storage means 23 and 24. Voltages E1 and E2 are coupled to attenuators 10 and 11 respectively to control the attenuation level of each attenuator. The voltages E1 and E2 produced by amplifier 26 act to change the attenuation of each attenuator so that the detected noise voltages applied to amplifier 26, from storage means 23 and 24, approach equality. If, for example, the noise in the signal applied to attenuator 10 from channel A increases the noise appearing at both terminals of the combining resistance, points 6 and 7 will increase. However, the increase in noise voltage at point 6 will be greater than that at point 7, so that the voltages applied to differential amplifier 26 from storage means 23 and 24 will no longer be equal. Amplifier 26 acts to make the noise voltages at points 6 and 7 approach equality by varying control voltages E1 and E2 and thus changing the attenuation of attenuators 10 and 11. In this example E2 causes the attenuation of attenuator 11 to decrease thus increasing the noise at the terminals of the combining resistance, points 6 and 7, due to the noise from channel B. E1 causes the attenuation of attenuator 10 to increase thus decreasing the noise at the terminals of the combining resistance due to the noise from channel A. This action continues until the noise increase from channel A is offset by the action of the attenuators and the noise voltages at the terminals of the combining resistance are again close to equality. When this occurs the detected noise voltages from storage means 23 and 24, applied to differential amplifier 26, are as close to equality as the gain of amplifier 26 will allow and no further change in E1 and E2 takes place. The noise voltages across the combining resistance are again equal though at a higher value than before the noise on channel A increased. This action of amplifier 26 in reacting to any change from near equality in the detected noise voltages applied thereto continues in response to changes in the noise applied to the combining resistance from channels A and B.

Figure 2:
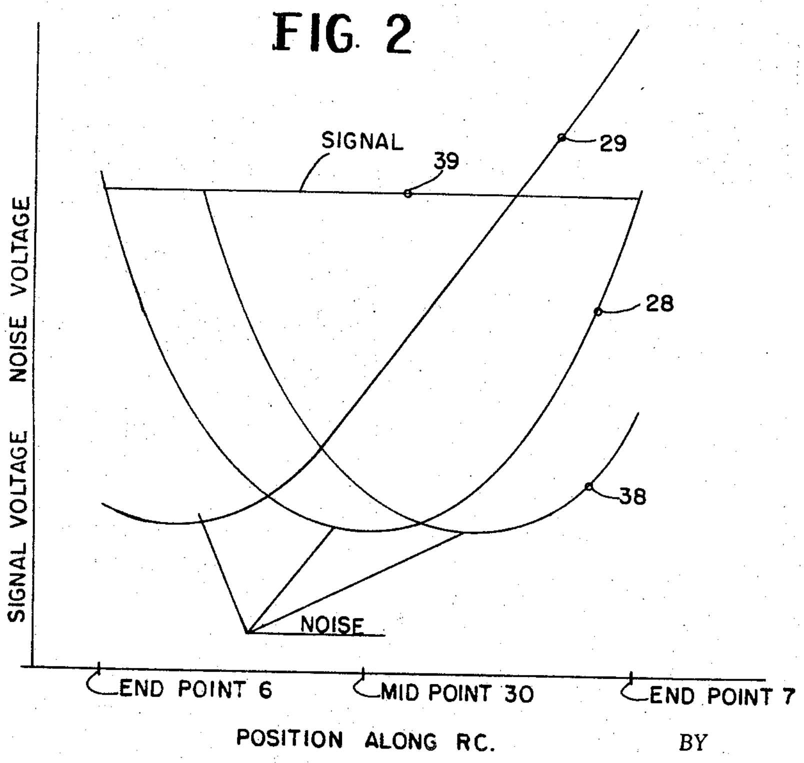
FIG. 2 is a set of curves showing how ratio squared combining is achieved in the system of this invention.

Referring to FIG. 2, noise and signal voltages are plotted against the position along the combining resistance R*c*. R*c* is represented by combining resistance circuits 15 and 16 of FIG. 1, with points 6 and 7 being the end points, and point 30 being the midpoint. Since the amplitude of the signal from each RF, mixer, and detector stage is the same, the noise present at the inputs to R*c*, points 6 and 7 of FIG. 1, is a measure of the relative signal to noise ratio of each of the two received signals. Curve 28 of FIG. 2 shows the magnitude of the noise voltage with respect to ground at any point along R*c* when the noise voltages at the end points of R*c* 6 and 7 are equal. Since noise is not coherent its amplitude diminishes until it reaches a minimum at the midpoint 30. Curves 29 and 38 represent the magnitude of the noise voltage along R*c* where the noise voltages present at the end points 6 and 7 are not equal. It can be seen that the curves 28, 29 and 38 have the same shape, parabolic, but are displaced. The signal amplitude 39 at any point along R*c* is substantially constant as the signals applied to the end points 6 and 7 are coherent. Thus the noise parabola minimum is the point at which the signal to noise ratio of the combined signal is optimum. By making the noise voltages at the end points 6 and 7 equal, the noise parabola minimum will occur at the midpoint 30 of R*c* which is coupled to the line driver 9 of FIG. 1.

Figures 3, 4:
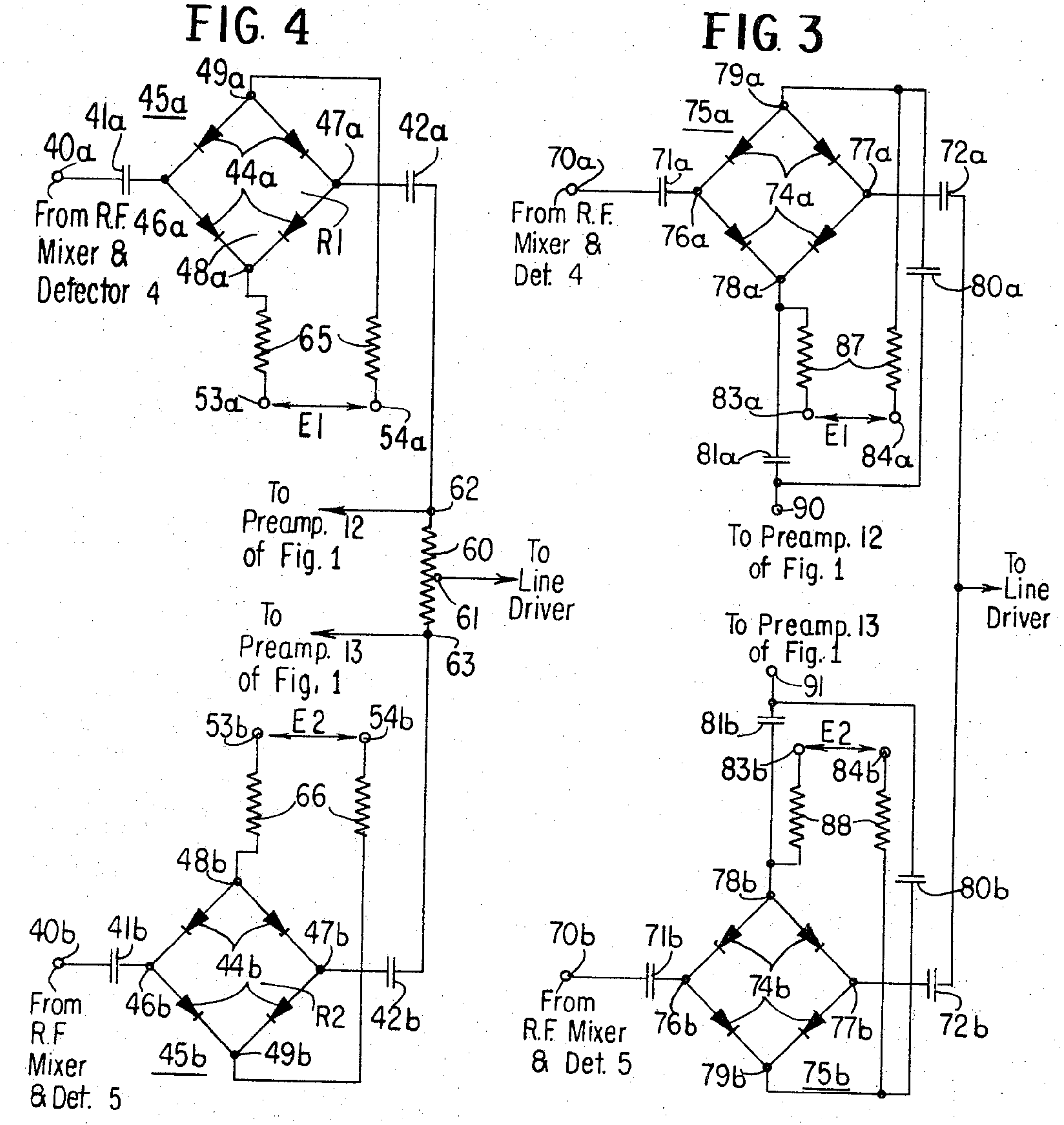
FIG. 3 is a schematic diagram of one form of the attenuators and combining resistance shown in FIG. 1.
FIG. 4 is a schematic diagram of a second form of the attenuators and combining resistance shown in FIG. 1.

A schematic diagram of one embodiment of the diode bridge attenuators and combiner resistances 10, 11, 15 and 16 of FIG. 1 is shown in FIG. 3. The signals from RF mixer and detector stages 4 and 5 are applied to terminals **70*a* and 70*b* respectively. The operation of each of the diode bridge attenuators is identical and only the bridge coupled to RF and mixer stage 4 will be described in detail. The signal from RF, mixer and detector stage 4 is coupled from terminal 70*a* to the bridge 75*a* by coupling capacitor 71*a*. The output from the bridge appearing at bridge terminal 77*a* is coupled to a line driver amplifier by means of capacitor 72*a*. Likewise the output of bridge 75*b* is coupled from bridge terminal 77*b* to the line driver amplifier by coupling capacitor 72*b*. The signals from RF, mixer and detector stages 4 and 5 are attenuated by bridges 75*a* and 75*b* to an extent dependent upon the bias voltage E1 applied to the diodes 74*a* and the bias voltage E2 applied to the diodes 74*b*. The signal applied to bridge 75*a* from RF and mixer stage 4 is sampled at points 78*a* and 79*a*, combined through capacitors 80*a* and 81*a*, and applied to preamplifier 12 of FIG. 1 from terminal 90. The signal applied to bridge 75*b* from RF and mixer stage 5 is sampled at points 78*b* and 79*b*, combined through capacitors 80*b* and 81*b*, and applied to preamplifier 13 of FIG. 1 from terminal 91. The resistance of diode bridges 75*a* and 75*b* measured across terminals 90 and 91** represent R*c*, the combining resistance. The signals thus applied to preamplifiers 12 and 13 from the diode attenuators **75*a* and 75*b* are processed by the combiner 8** of FIG. 1 to produce biasing voltages E1 and E2 in a manner previously described.

The voltage output from differential amplifier 26 of FIG. 1 is applied to terminals **83*a*, 84*a*, 83*b* and 84*b*. The voltage applied to attenuator bridge 75*a* is E1 and the voltage applied to attenuator bridge 75*b* is E2. E1 and E2 act to change the attenuation provided by diodes 74*a* and 74*b*** by changing their bias. As the attenuation of one bridge is increased the attenuation of the other bridge decreases. This action attenuates the signals from the two channels in such proportion that the noise signals at each end of the combining resistance R*c*, will again be substantially equal.

The noise voltage appearing at terminals 90 and 91 of R*c* is equal to the square root of the sum of the squares of the noise voltages at these terminals produced by the separate noise voltages from channels A and channel B. Assuming the noise received on each channel is the same and the bridge attenuators **75*a* and 75*b*** have the same attenuation the noise voltage appearing across R*c* is substantially equal to zero. When the noise voltages at each terminal of R*c* are substantially equal the signal to noise ratio of the combined signal at point 30 of FIG. 1 is at a maximum and optimum combining results.

If the noise on channel A increases the noise voltage appearing at the terminals of R*c* will likewise increase. However, the increase in noise voltage at terminal 91 will be less than the increase at terminal 90 because of the voltage drop across R*c*. An error signal is thus developed across R*c* by the increase in noise output from channel A and is coupled to the preamplifiers 12 and 13 of FIG. 1 which together with filter 17, amplifier 19, detectors 21 and 22, and differential amplifier 26 form a feedback loop. The error signal applied to this loop from the terminals of R*c* changes the direct current output voltages of the differential amplifier 26, E1 and E2, which are applied to diode attenuator **75*a* and 75*b* of FIG. 3 respectively. The sense of the voltage change is such that the attenuation of diode bridge 75*a* is increased and the attenuation of diode bridge 75*b* is decreased. Thus the noise at terminal 90 decreases and the noise at terminal 91 increases. This action continues until the noise voltages appearing at the terminals 90 and 91** are again close to equality.

While the point at which the two signals are combined in the embodiment of FIG. 3 is not the midpoint of R*c* it is possible to pick a loop gain in such a way that optimum ratio squared combining can be obtained. This is particularly true when the attenuation of the attenuators used is non-linear as, for example, the hyperbolic resistance control curve developed by biased diodes.

A schematic diagram of a second embodiment of the diode bridge attenuator combiner resistance circuits is shown in FIG. 4. The signals from RF, mixer and detector stages 4 and 5 are applied to terminals **40*a* and 40*b* respectively. The signal from RF, mixer and detector stage 4 is coupled from terminal 40*a* to the bridge 45*a* by coupling capacitor 41*a*. The output from the bridge is coupled to terminal 62** of resistor R*c* 60 by means of capacitor **42*a*. The other terminal 63** of resistor R*c* is coupled to bridge **45*b* through capacitor 42*b*. The midpoint 61** of R*c* is coupled to the line driver amplifier 9 of FIG. 1. Bridge **45*a* attenuates the signals applied thereto in proportion to the bias voltage E1 applied to diodes 44*a* through resistors 65 and bridge 45*b* attenuates signals applied thereto in proportion to the bias voltage E2 applied to diodes 44*b* through resistors 66. The signals at the terminals of 62 and 63 are coupled to preamplifiers 12 and 13** of FIG. 1. If the voltage across R*c* becomes unbalanced the control voltages E1 and E2 are changed in a manner previously described. The change in these voltages is such that the voltages at each end of R*c* are made substantially equal. In this embodiment the entire bridge is used as an attenuator and a fixed resistor 60 is used for the combining resistance R*c*.

Thus a closed loop ratio squared combiner has been shown in which the noise voltage across a combining resistance is used to attenuate the signals applied to the combining resistance in such a manner as to achieve an optimum signal to noise ratio. This system does not require precisely calibrated amplifiers and since only one amplifier is used there are no amplifier tracking problems.

What is claimed is:

1. In a combiner system having first and second portions for receivng respectively first and second communication signals each containing the same information and having a signal-to-noise ratio independent of the signal-to-noise ratio of the other signal, and a third portion for translating a signal applied thereto; combiner means coupling the third portion to the first and second portions and being responsive to the communication signals from the first and second portion to apply a combined signal to the third portion, said combiner means including in combination, first and second attenuator means each having an input circuit coupled to the first and second portions respectively and an output circuit coupled to the third portion, each of said attenuator means having a sampling portion coupled to said output circuit and a control portion, means coupled to said sampling portions of said first and second attenuator means and responsive to the output signals from the attenuator to generate a control signal, and means coupling said control signal to said control portions, said attenuator means being responsive to said control signal to adjust the attenuation thereof whereby the signal-to-noise ratio of the combined signal applied to said third portion is greater than the signal-to-noise ratio of each of the first and second signals.

2. In a combiner system having first and second portions for receiving respectively first and second communication signals each containing the same information and having a signal-to-noise ratio independent of the signal-to-noise ratio of the other signal, and a third portion for translating a signal applied thereto; combiner means coupling the third portion to the first and second portions and being responsive to the communication signals from the first and second portions to apply a combined signal to the third portion, said combiner means including in combination, first and second attenuator means each having an input portion, an output portion, a sampling portion coupled to said output portion, and a control portion, said input portions being coupled to the first and second portions respectively, said output portions being coupled to the third portion, said attenuator means acting to attenuate the first and second signals and to control the combined signal applied to the third portion, amplifier means, potential generating means coupled to said amplifying means, means coupling said sampling portion to said amplifying means, said sampling means acting to apply a portion of the attenuated first and second signals to said amplifying means, said amplifying means being responsive to the noise in said first and second attenuated signals applied thereto to develop amplified noise signals, said potential generating means being responsive to said noise signals to generate control potentials, means applying said control potentials to said control portions, the attenuation of each of said attenuators being responsive to said control potential applied thereto to cause the noise portions of each of said signals coupled from said sampling portions to said amplifying means to be substantially the same, whereby the signal-to-noise ratio of said combined signal is greater than the signal-to-noise ratio of each of the first and second signals.

3. In a combiner system having first and second portions for receiving respectively first and second communication signals each containing the same information and having a signal-to-noise ratio independent of the signal-to-noise ratio of the other signal, and a third portion for translating a signal applied thereto; combiner means coupling the third portion to the first and second portions and being responsive to the communication signals from the first and second portions to apply a combined signal to the third portion, said combiner means including in combination, first and second attenuator means each having an input portion, and an output portion, said input portions being coupled to the first and second portions respectively, combiner resistance means coupled to said output portions, means coupling said combiner resistance means to the third portion, said attenuator means acting to attenuate the first and second signals applied to said combiner resistance means, amplifier means, potential generating means coupled to said amplifying means, means coupling said combiner resistance means to said amplifying means to apply a portion of the attenuated first and second signals thereto, said amplifying means being responsive to the noise in said first and second attenuated signals applied thereto to develop amplified noise signals, said potential generating means being responsive to said noise signals to generate control potentials, means applying said control potentials to said first and second attenuators the attenuation thereof being responsive to said control potentials to cause the noise portions of each of said signals coupled from said combiner resistance means to said amplifying means to be substantially the same, whereby the signal-to-noise ratio of said combined signal applied to said third portion is greater than the signal-to-noise ratio of each of the first and second signals.

4. In a combiner system having first and second portions for receiving respectively first and second communication signals each containing the same information and having a signal-to-noise ratio independent of the signal-to-noise ratio of the other signal, and a third portion for translating a signal applied thereto; combiner means coupling the third portion to the first and second portions and being responsive to the communication signals from the first and second portions to apply a combined signal to the third portion, said combiner means including in combination, first and second diode bridge attenuator means each having a first diode portion coupled to a second diode portion, said first diode portions being coupled to the first and second portions respectively, said second diode portions being coupled to the third portion, said first diode portions acting to attenuate the first and second signals applied to said second diode portions, amplifier means, potential generating means coupled to said amplifying means, means coupling said second diode portions to said amplifying means to apply a portion of the attenuated first and second signals thereto, said amplifying means being responsive to the noise in said first and second attenuated signals applied thereto to develop amplified noise signals, said potential generating means being responsive to said first and second noise signals to generate control potentials, means applying said control potentials to said first and second diode portions, the attenuation of each of said attenuator means being responsive to said control potentials to cause the noise portions of said signals coupled from said second diode portions to said amplifying means to be substantially the same, whereby the signal-to-noise ratio of said combined signal applied to said third portion is greater than the signal-to-noise ratio of each of the first and second signals.

5. In a combiner system having first and second portions coupled for receiving respectively first and second communication signals each containing the same information and having a signal-to-noise ratio independent of the signal-to-noise ratio of the other signal, and a third portion for translating a signal applied thereto; combiner means coupling the third portion to the first and second portions and being responsive to the communication signals from the first and second portions to apply a combined signal to the third portion, said combiner means including in combination, first and second diode bridge attenuator means coupled to the first and second portions respectively, combining resistance means having first, second, and third terminals, means coupling said first terminal to said first attenuator means and said second terminal to said second attenuator means, said diode bridge attenuator means acting to attenuate the first and second signals applied thereto, means coupling the third portion to said third terminal, amplifier means, potential generating means coupled to said amplifying means, means coupling said first and second terminals to said amplifying means to apply a portion of the attenuated first and second signals thereto, said amplifying means being responsive to the noise in said first and second attenuated signals applied thereto to develop amplified noise signals, said potential generating means being responsive to said first and second noise signals to generate control potentials, means applying said control potentials to said first and second diode bridge attenuator means portions, the attenuation of each of said attenuator means being responsive to said control potentials to cause the noise portions of said signals coupled from said second diode portions to said amplifying means to be substantially the same, whereby the signal-to-noise ratio of said combined signal applied to said third portion is greater than the signal-to-noise ratio of each of the first and second signals.

6. In a combiner system having first and second portions for receiving respectively first and second communication signals each containing the same information and having a signal-to-noise ratio independent of the signal to noise ratio of the other signal, and a third portion for translating a signal applied thereto; combiner means coupling the third portion to the first and second portions and being responsive to the communication signals from the first and second portions to apply a combined signal to the third portion, said combiner means including in combination, first and second attenuator means each having an input portion, output portion, sampling portion and control portion, said input portions being coupled to the first and second portions respectively, said output portions being coupled to the third portion, said attenuator means acting to attenuate the first and second signals and to control the combined signal applied to the third portion, amplifier means, potential generating means coupled to said amplifying means, switching means alternately coupling said sampling portions of said first and second attenuator means to said amplifying means to apply a portion of the attenuated first and second signals thereto, said amplifying means being responsive to the noise in said first and second attenuated signals applied thereto to develop amplified noise signals, said potential generating means being responsive to said noise signals to generate control potentials, means applying said control potentials to said control portions, the attenuation of each of said attenuator means being responsive to said control potential applied thereto to cause the noise portions of each of said signals coupled from said sampling portion to said amplifying means to be substantially the same, whereby the signal-to-noise ratio of said combined signal is greater than the signal-to-noise ratio of each of the first and second signals.

7. In a combiner system having first and second portions for receiving respectively first and second communication signals each containing the same information and having a signal-to-noise ratio independent of the signal-to-noise ratio of the other signal, and a third portion for translating a signal applied thereto; combiner means coupling the third portion to the first and second portions and being responsive to the communication signals from the first and second portions to apply a combined signal to the third portion, said combiner means including in combination, first and second diode bridge attenuator means each having a first diode portion coupled to a second diode portion, said first diode portions being coupled to the first and second portions respectively, said second diode portions being coupled to the third portion, said first diode portions acting to attenuate the first and second signals applied to said second diode portions, amplifier means, potential generating means, first and second switch means, said first switch means alternately coupling said second diode portions of said first and second attenuator means to said amplifying means to apply a portion of the attenuated first and second signals thereto, said amplifying means being responsive to the noise in said first and second attenuated signals applied thereto to develop first and second amplified noise signals, first and second detector means, said second switching means being coupled to said first switching means and acting to couple said amplified noise signals from said first attenuator means to said first detector means and said amplified noise signal from said second attenuator means to said second detector means, said detector means being responsive to said first and second amplified noise signals to develop first and second detected signals, means coupling said first and second detector means to said potential generating means, said potential generating means being responsive to said first and second detected signals to generate control potentials, means applying said control potentials to said first and second diode portions, the attenuation of each of said attenuators being responsive to said control potentials to cause the noise portions of said signals coupled from said second diode portions to said amplifying means to be substantially the same, whereby the signal-to-noise ratio of said combined signal applied to said third portion is greater than the signal-to-noise ratio of each of the first and second signals.

References Cited

UNITED STATES PATENTS 2,969,457 1/1961 Felix et al. ---------- 325—305

KATHLEEN H. CLAFFY, *Primary Examiner.*

R. S. BELL, *Assistant Examiner.*